(12) United States Patent
Funabashi

(10) Patent No.: US 8,510,475 B2
(45) Date of Patent: Aug. 13, 2013

(54) APPLICATION SOFTWARE PROTECTION METHOD AND STREAM EDIT PROCESSING SYSTEM

(75) Inventor: Ryoichi Funabashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/964,824

(22) Filed: Dec. 10, 2010

(65) Prior Publication Data

US 2011/0145441 A1    Jun. 16, 2011

(30) Foreign Application Priority Data

Dec. 10, 2009   (JP) ................................ 2009-280751

(51) Int. Cl.
   *G06F 15/16*   (2006.01)
(52) U.S. Cl.
   USPC ........................................................ 709/246
(58) Field of Classification Search
   USPC ........................................................ 709/246
   See application file for complete search history.

(56) References Cited

U.S. PATENT DOCUMENTS

| 6,760,750 | B1 * | 7/2004 | Boneh et al. ................... 709/204 |
| 7,180,618 | B2 * | 2/2007 | Ueda et al. ................... 358/1.15 |
| 2004/0039794 | A1 * | 2/2004 | Biby et al. .................... 709/217 |
| 2008/0195949 | A1 * | 8/2008 | Baum et al. .................... 715/723 |
| 2008/0201452 | A1 * | 8/2008 | Athas et al. .................... 709/219 |

FOREIGN PATENT DOCUMENTS

| JP | 2002-244827 A1 | 8/2002 |
| JP | 2002-543511 A | 12/2002 |
| WO | WO-00/67095 | 11/2000 |

* cited by examiner

*Primary Examiner* — Shirley Zhang
(74) *Attorney, Agent, or Firm* — Fujitsu Patent Center

(57) ABSTRACT

A method for protecting application software transmitted from a server to a client over a network, the method includes: determining an edit operation for an input stream using a first program; transmitting transmission information to the server, the transmission information including first characteristic information indicating a characteristic of the input stream and edit information indicating the edit operation; receiving a second program for executing the edit operation on the input stream, the second program including the transmission information; obtaining second characteristic information from the second program; comparing the first characteristic information and the second characteristic information; and executing, on the input stream, an edit based on the edit information by using the second program, when the first characteristic information and the second characteristic information match.

9 Claims, 7 Drawing Sheets

APPLICATION SOFTWARE PROTECTION METHOD AND STREAM EDIT PROCESSING SYSTEM

CROSS-REFERENCE TO RELATED APPLICATIONS

This application is based upon and claims the benefit of priority of the prior Japanese Patent Application No. 2009-280751, filed on Dec. 10, 2009, the entire contents of which are incorporated herein by reference.

FIELD

The embodiment discussed herein relate to an application-software protection method for a stream edit processing system for performing edit processing on a stream or the like by using application software transmitted over a network and a stream edit processing system that employs such a protection method.

BACKGROUND

In an information processing system in which a client executes processing by using application software transmitted over a network, a scheme in which the client is also provided with dedicated application software for performing data (stream) processing is known. For example, a configuration is known in which a server performs edit processing and transmits the edited data to the client each time the edit processing is performed. However, when a large amount of data is to be edited using application software, use of the configuration in which a server performs edit processing and transmits the edited data to the client each time the edit processing is performed results in a significant increase in the amount of network load. On the other hand, a scheme in which the application software is transmitted to the client so as to permit the client to execute edit processing may reduce the amount of network load.

In such a scheme, however, the application software transmitted to the client could be fraudulently executed at the client side to permit acquirement of a result of the execution of the application software. Thus, there is a need to protect the application software received over the network against fraudulent use.

One known example of a scheme for protecting application software against fraudulent use is a scheme that permits use of the application software for only a predetermined period of time after a client is authenticated by a server. In such a scheme, the application software causes the server and the client to perform handshaking through network communication so as to allow the server to recognize the execution state of the application software each time the application software is executed by the client, thereby achieving the above-described protection. Japanese Unexamined Patent Application Publication No. 2002-244827 and Japanese Unexamined Patent Application Publication No. 2002-543511 disclose protection of application software against fraudulent use.

SUMMARY

A method for protecting application software transmitted from a server to a client over a network, the method includes: determining an edit operation for an input stream using a first program; transmitting transmission information to the server, the transmission information including first characteristic information indicating a characteristic of the input stream and edit information indicating the edit operation; receiving a second program for executing the edit operation on the input stream, the second program including the transmission information; obtaining second characteristic information from the second program; comparing the first characteristic information and the second characteristic information; and executing, on the input stream, an edit based on the edit information by using the second program, when the first characteristic information and the second characteristic information match.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A problem of the related art is described next and an embodiment for carrying out the present invention is described. In the related art described above, a server transmits an authentication signal so that the server side manages the execution of the application software through handshaking, thereby managing a time period in which execution of the application software is permitted. However, there is a problem with the related art. For example, a user at the client may install a fake server to transmit a fraudulent authentication signal to the application software transmitted to the client, to thereby enable fraudulent use of the application software.

In particular, when application software for edit processing is used, fraudulent use, such as, e.g., performing unauthentic edit processing on an unauthentic input stream, unauthentic edit processing on an authentic input stream, or authentic edit processing on an unauthentic input stream, is possible. For example, even when the server collects information of an input stream through handshaking and restricts execution of the application software to only the authentic input stream, a state in which multiple types of edit processing can be performed on the input stream may occur. Accoring, the above-described related art scheme does not provide secure protection.

The present invention has been made in view of, for example, the foregoing technical problem and is to provide a method for protecting application software executed by a client and a stream edit processing system that employs such a protection method.

An embodiment for carrying out the present invention will be described below with reference to the accompanying drawings.

(1) Application Software Protection Operation

Figure 1:
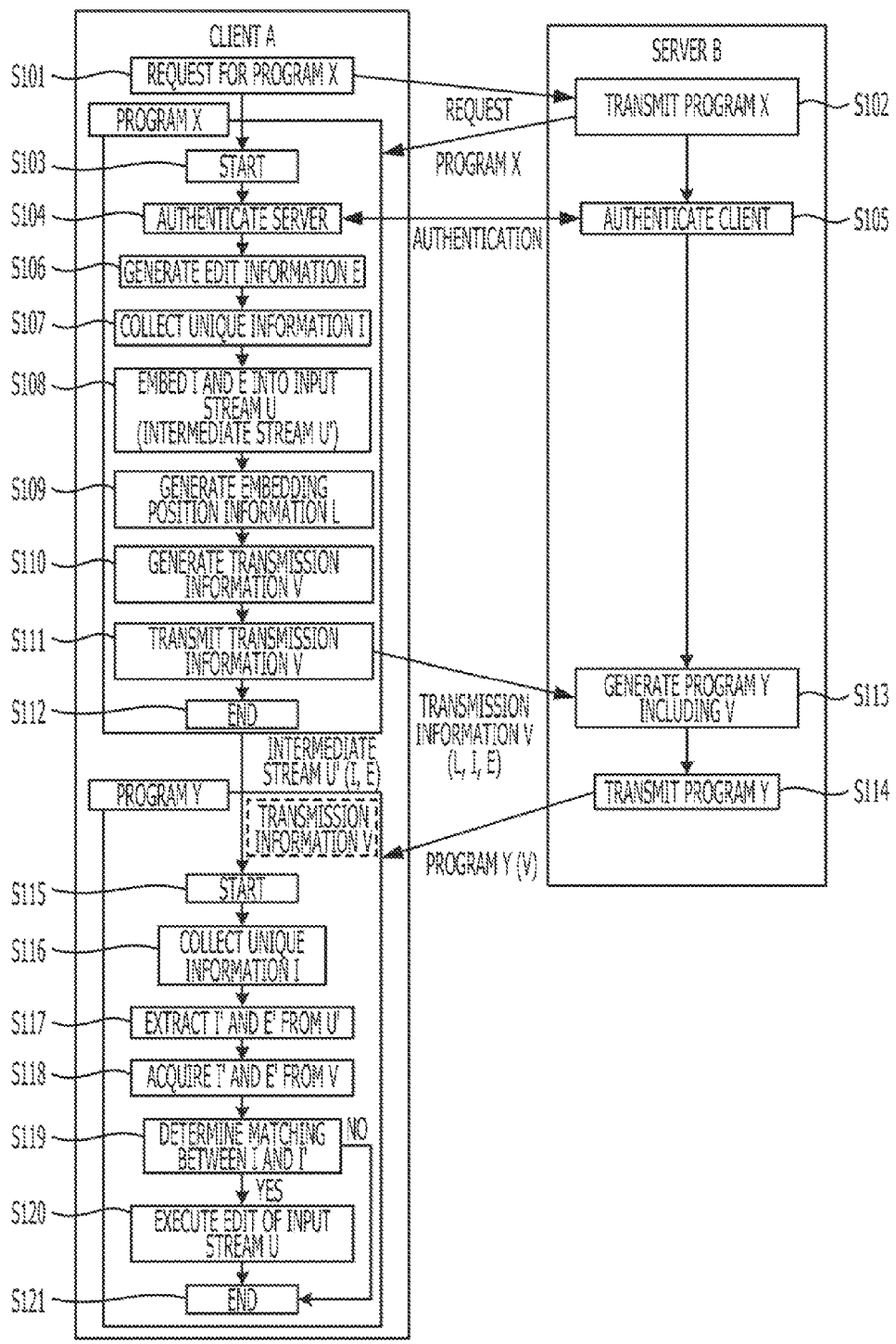
FIG. 1 illustrates a processing flow in a first operation example of application-software protection.
Figure 2:
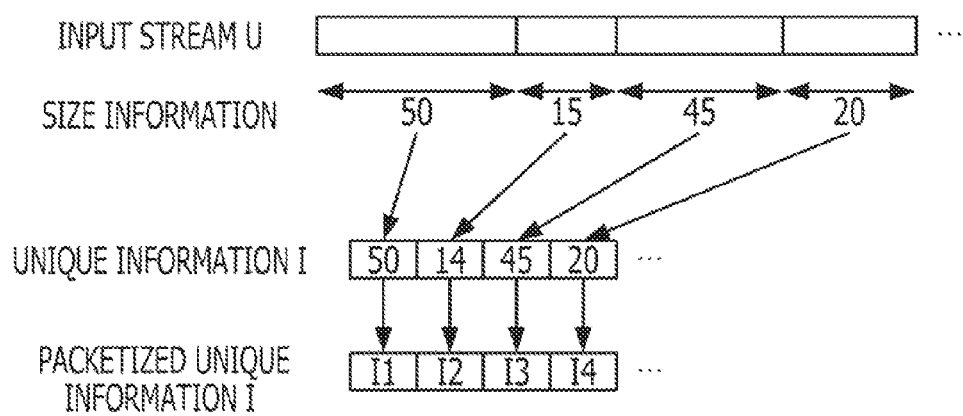
FIG. 2 conceptually illustrates a first example of collecting unique information.

A flow of processing of a first operation example and a second operation example of application-software protection according to an embodiment will now be described with reference to FIGS. 1 and 2.

(1-1) First Operation Example

A first operation example of application-software protection according to an embodiment will now be described with reference to FIG. 1. FIG. 1 is a processing flow of the first operation example of the application-software protection.

First, in operation S101, a client A transmits, to a server B, a request for a program X including application software used for edit processing and for determining an edit operation. In operation S102, the server B transmits the requested program X to the client A. In operation S103, the client A launches the transmitted program X to start an operation.

Upon launch of the program X, the process proceeds to operations S104 and S105 in which the program X performs authentication processing between the client A and the server B to authenticate whether or not they are appropriate client and server.

Subsequently, in operation S106, the program X determines an operation of edit processing for an input stream U to be subjected to edit processing performed by the client A. As a result, the program X generates edit information E for specifying the edit processing operation. The edit information E includes an operation code indicating, for example, an edit processing type (e.g., cutting processing, paste processing, copy processing, fade-in processing, or fade-out processing). The edit information E also includes information indicating, in the input stream U, an edit start point at which edit processing is started (e.g., an address or a time point representing a start point) and an edit end point at which the edit processing is finished (e.g., an address or a time point representing an end point).

In operation S107, at the same time of, before, or after the generation of the edit information E, the program X collects unique information I, which is information unique to the input stream U.

Figure 3:
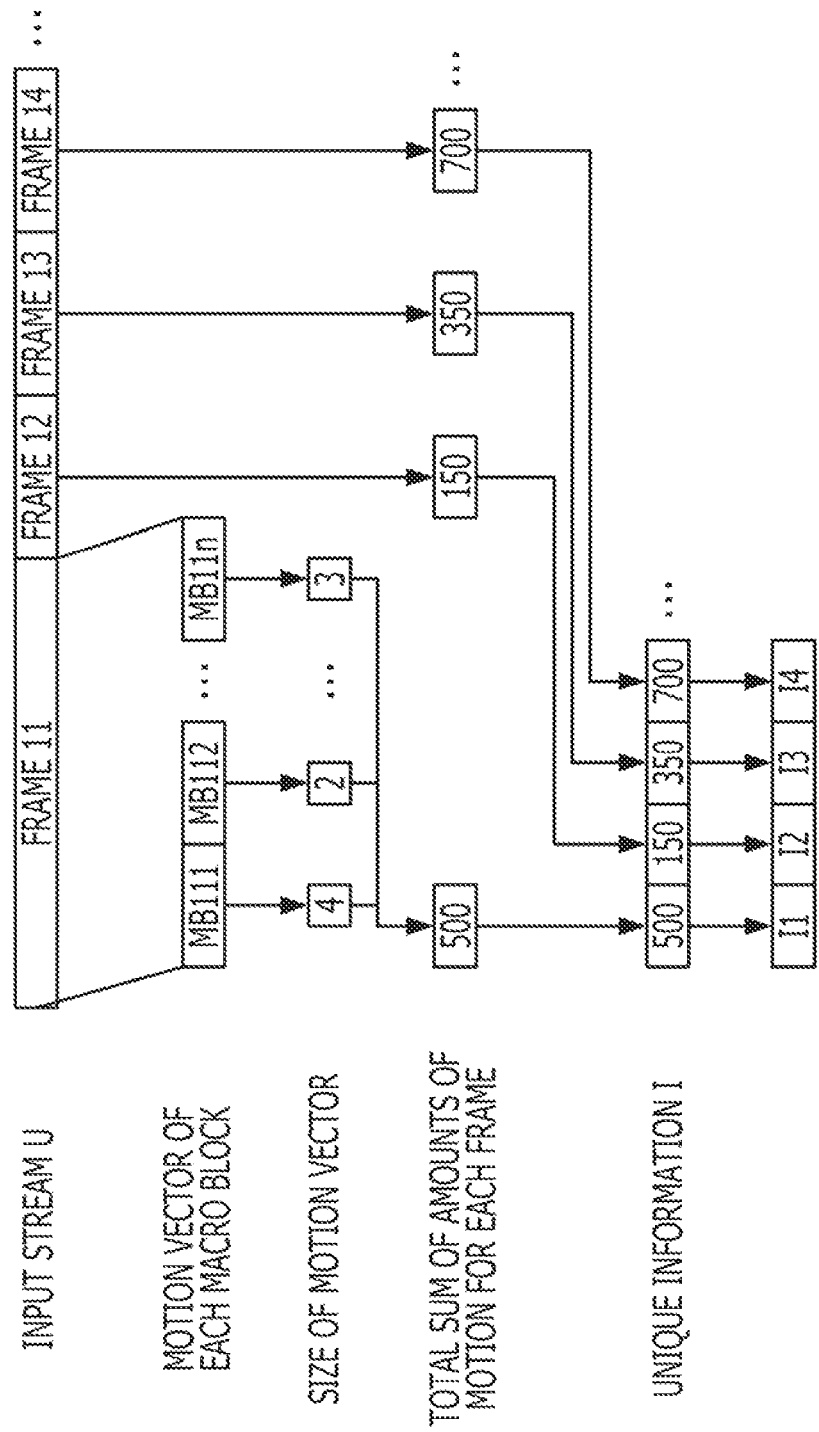
FIG. 3 conceptually illustrates a second example of collecting the unique information.
Figure 4:
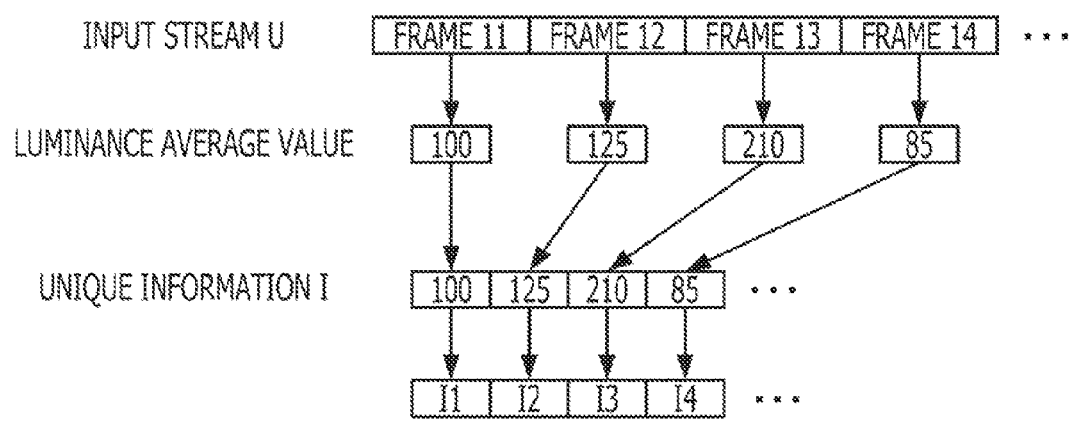
FIG. 4 conceptually illustrates a third example of collecting the unique information.

An example of the unique information I used for the application-software protection operation according to the present embodiment and an example of an operation of collecting the unique information I will now be described with reference to FIGS. 2 to 4. FIGS. 2 to 4 are conceptual diagrams each illustrating an example of operation for collecting the unique information I.

A first example of the unique information I uses data sizes of frames in the input stream U. As illustrated in FIG. 2, the program X collects data sizes (50, 15, 45, 20, . . . ) of frames in the input stream U in order of the frames. The program X generates the unique information I by arranging the collected frame data sizes in order of the frames in the input stream U.

A second example of the unique information I uses the amounts of motion in frames in the input stream U. As illustrated in FIG. 3, the program X collects the amounts of motion for the respective macroblocks in each of the frames in the input streams U and sums up the collected amounts of motion to obtain total sums (500, 150, 350, 700, . . . ) of the amounts of motion in the respective frames. The program X generates the unique information I by arranging, in order of the frames in the input stream U, the total sums of the collected amounts of motion in the frames. Although FIG. 3 illustrates a concept of collection and addition of the sizes of motion vectors for the respective macro blocks only in a frame 11, collection and addition of motion vectors for macro blocks are also performed on other frames.

A third example of the unique information I uses average values of luminance of frames in the input stream U. As illustrated in FIG. 4, the program X collects luminance average values (100, 125, 210, 85, . . . ) of the frames in the input stream U. The program X generates the unique information I by arranging the collected frame-luminance average values in order of the frames in the input stream U.

In an embedding operation of the unique information I and a generation operation of transmission information V (which operations are described below), the program X executes processing using packetized unique information I. In this case, the program X packetizes the unique information I by dividing the unique information, such as, e.g., the size information, the total sums of the amounts of motion, or the luminance average values, for the respective frames in the original input stream U. For example, in the example illustrated in FIG. 2, packets (I1, I2, I3, I4, . . . ) of the packetized unique information I contain the sizes (50, 15, 45, 20, . . . ) of the corresponding frames.

The information used as the unique information I is not limited to the above-described examples. For example, the information may be any appropriate information (e.g., information indicating a characteristic unique to the input stream U) that allows the input stream U to be appropriately distinguished from another input stream.

Referring back to FIG. 1, in operation S108, the program X generates an intermediate stream U' by embedding part or all of the generated edit information E and the collected unique information I into null packets in the input stream U. In this case, the program X embeds the edit information E and the unique information I at positions included in the null packets in the input stream U and determined based on the edit information E and the unique information I. In operation S109, the program X generates embedding position information L indicating the positions at which the edit information E and the unique information I are embedded.

Thereafter, in operation S110, the program X generates transmission information V containing edit information E and unique information I that were not embedded in the input stream U in operation S108 (if such information exists) and the embedding position information L. The generated transmission information V becomes, for example, sequential data of the embedding position information L and the edit information E and the unique information I for each frame.

Figure 5:
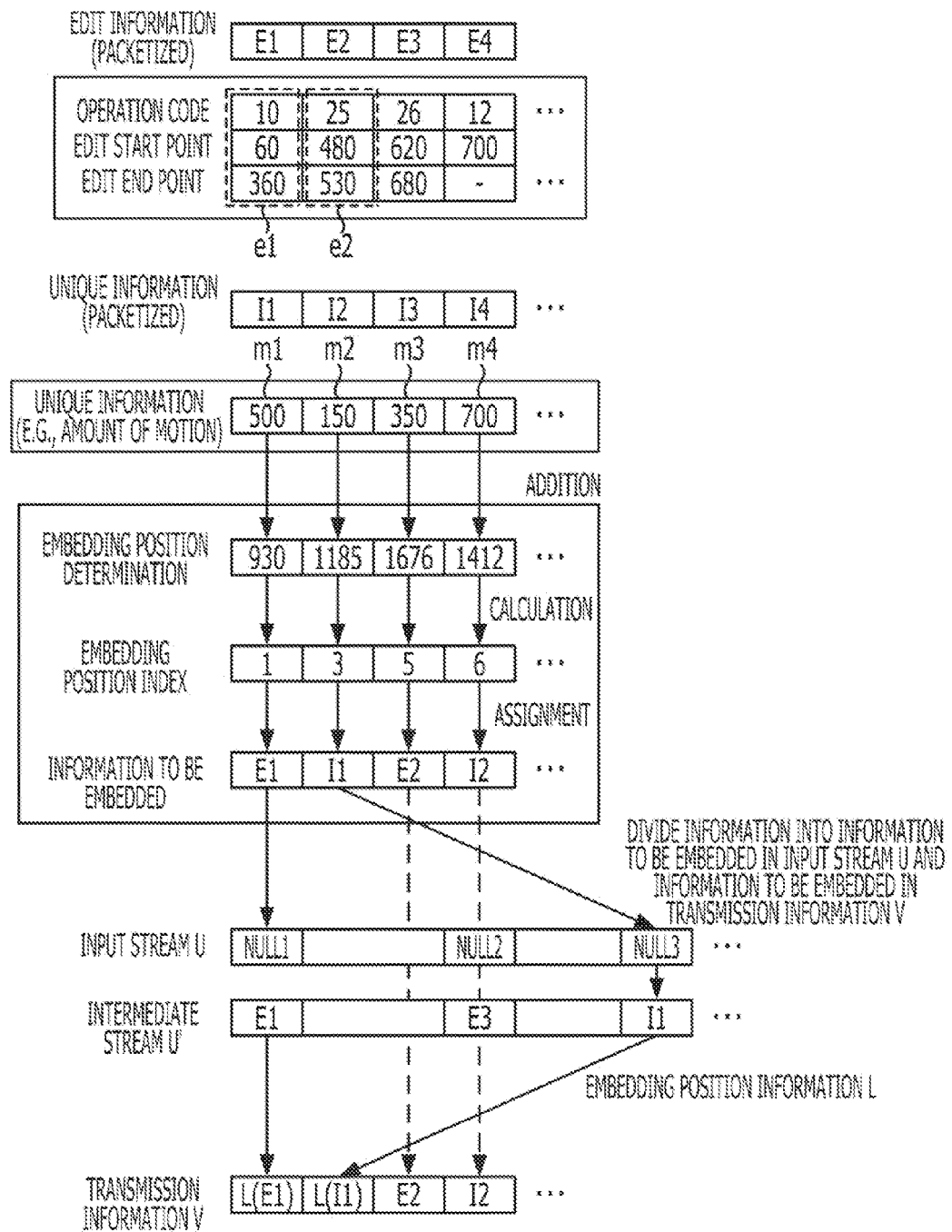
FIG. 5 conceptually illustrates a scheme of embedding edit information and the unique information, the scheme being associated with the processing flow illustrated in FIG. 1.

An embedding operation of the edit information E and the unique information I for the input stream U will now be described with reference to FIG. 5. FIG. 5 conceptually illustrates a scheme of embedding the edit information E and the unique information I into the input stream U.

In this operation example, the edit information E and the unique information I are embedded at positions included in the null packets in the input stream U and determined based on the edit information E and the unique information I. In this operation example, it is assumed that, as illustrated in the upper portion in FIG. 5, packetized information including an operation code indicating the type of edit processing executed on the input stream U, an edit start point (e.g., a start frame) at which the edit operation is executed, and an edit end point (e.g., an end frame) is used as the edit information E. It is also assumed that packetized information indicating the total sum of the amounts of motion in each frame in the input streams U is used as the unique information I.

Next, a description will be given of a method for determining the embedding position on the basis of the edit information E and the unique information I. First, the program X detects a total number "N" of null packets contained in the input stream U and the amount "l_n" of information that can be embedded in each null packet. In addition, the program X sequentially gives item numbers (e.g., null1, null2, null3, . . . ) to the null packets.

Next, the program X determines a total amount "Σl_n" of information that can be embedded in the null packets in the input stream U and determines, in a range that does not exceed the total amount "Σl_n" of information, the amount of information to be embedded in the null packets in the input stream U. Part of the edit information E or unique information I which exceeds the total amount "Σl_n" of information is contained in the transmission information V in operation S110 in FIG. 1. The program X, however, may embed the edit information E and the unique information I having an arbitrary amount of information that is smaller than the total amount "Σl_n" of information into the null packets in the input stream U. The total number of null packets in which the edit information E and the unique information I are to be embedded, of the null packets in the input stream U, is denoted by Np and the number of information packets of the edit information E and the unique information I contained in the transmission information V is represented by Nv. It is preferable that a packet of edit information E or unique information I be embedded in one null packet. In such a case, the sum of Np and Nv is equal to the total number of packets of the edit information E and the unique information I.

Subsequently, the program X generates processing-dependent information e1, e2, . . . obtained by adding the operation code, the start frame, and the end frame, contained in the edit information E, to the corresponding packets (i.e., E1, E2, . . . ). FIG. 5 illustrates an example in which:

the processing-dependent information e1 corresponding to the edit information E1 is 430 (=10+60+360);

the processing-dependent information e2 corresponding to the edit information E2 is 1035 (=25+480+530);

the processing-dependent information e3 corresponding to the edit information E3 is 1326 (=26+620+680); and the processing-dependent information e4 corresponding to the edit information E4 is 712 (=12+700).

The program X also collects amount-of-motion information m1, m2, . . . for the corresponding packets (i.e., I1, I2, . . . ) in the unique information I. FIG. 5 illustrates an example in which:

the amount-of-motion information m1 for the unique information I1 is 500;

the amount-of-motion Information m2 for the unique information I2 is 150;

the amount-of-motion Information m3 for the unique information I3 is 350; and the amount-of-motion Information m4 for the unique information I4 is 700.

The program X determines embedding position indices by: (Processing-dependent information e+Amount-of-motion information m) % (Total number of packets (Np+Nv)−Number of already embedded packets). The determined embedding position indices are assigned to the edit information E and the unique information I sequentially from the beginning. The edit information E and the unique information I are embedded in the null packets in the input stream U which are specified by the embedding position indices. According to the embedding operation, the item numbers of the unique null packets in which the edit information E and the unique information I are to be embedded are determined.

In this case, when the embedding position index assigned to the edit information E or the unique information I to be embedded is less than or equal to the item number of the null packet used for the embedding, the edit information E or the unique information I is embedded in the input stream U. On the other hand, when the embedding position index assigned to the edit information E or the unique information I to be embedded is greater than the item number of the null packet used for the embedding, the edit information E or the unique information I is contained in the transmission information V. For example, FIG. 5 illustrates an example in which embedding position indices are determined to be 1, 3, 5, and 6 sequentially. It is assumed that three null packets used for the embedding exist. In this case, the edit information E1 corresponding to the embedding position index "1" is embedded in the null packet null1 in the input stream U. The unique information I1 corresponding to the embedding position index "3" is embedded in the null packet null3 in the input stream U. The edit information E2 corresponding to the embedding position index "5" is arranged in the transmission information V. The unique information I2 corresponding to the embedding position index "6" is also arranged in the transmission information V.

The program X also generates, as the embedding position information L, the positions of the edit information E and the unique information I embedded in the input stream U. For example, the program X generates embedding position information L (E1) including both information indicating the edit information E1 (e.g., an information type and an item number) and information (e.g., an item number) indicating a null packet in which the edit information E1 is embedded. The embedding position information L is arranged in the transmission information V. That is, the transmission information V is generated by sequential arrangement of the edit information E and the unique information I that were not embedded in the input stream U and the embedding position information L of the edit information E and the unique information I that were embedded in the null packets in the input stream U. For example, in the example of FIG. 5, since the edit information E1 and the unique information I1 are embedded in the input stream U, the embedding position information L (E1) indicating the position at which the edit information E1 is embedded and embedding position information L (I1) indicating the position at which the unique information I1 is embedded are arranged in the transmission information V. Subsequently, the edit information E2 and the unique information I2 that were not embedded in the input stream U are arranged in the transmission information V.

Referring back to FIG. 1, in operation S111, the program X transmits the generated transmission information V to the server B. Thereafter, in operation S112, the program X ends the operation.

Subsequently, in operation S113, the server B generates a program Y in which the received transmission information V is embedded and application software for executing edit processing is included. In operation S114, the server B transmits the generated program Y to the client A. In operation S115, the client A launches the transmitted program Y to start an operation.

After the launch, in operation S116, the program Y collects the unique information I from the input stream U (or the intermediate stream U'). In this case, the program Y collects the unique information I from the input stream U, for example, as in the operation performed by the program X in operation S107.

Subsequently, in operation S117, the program Y extracts the edit information E and the unique information I embedded in the intermediate stream U', on the basis of the embedding position information L contained in the transmission information V. In operation S118, the program Y acquires the edit information E and the unique information I from the transmission information V embedded in the program Y. The edit information E and the unique information I extracted in operation S117 and the edit information E and the unique information I acquired in operation S118 are portions that are different from each other in the original edit information E and the unique information I. Thus, the original edit information E and the unique information I are restored from those edit information E and unique information I. The edit information E and the unique information I acquired in operations S117 and S118 and the restored edit information E and unique information I are referred to as edit information E' and unique information I', respectively, for discrimination.

In operation S118, the program Y determines whether or not the unique information I collected in operation S116 and the restored unique information I' match.

When it is determined that the unique information I and the unique information I' match, the process proceeds to operation S120 in which the program Y executes the edit operation, indicated by the edit information E', on the input stream U and outputs the resulting stream as an edit stream W. Thereafter, in operation S121, the program Y ends the operation. On the other hand, when the unique information I and the unique information I' do not match, the program Y terminates all the processing to end the operation.

In the first operation example of the application-software protection method, at least part of the input-stream unique information I collected by the program X and at least part of the edit information E indicating the edit operation performed on the input stream are embedded in the input stream U. In addition, another part of the edit information E and the unique information I and the embedding position information L indicating the positions at which the edit information E and the unique information I are embedded in the input stream U are transmitted to the server B as the transmission information and are embedded in the program Y for execution of edit processing. The program Y determines whether or not the unique information I' restored from part of the unique information I extracted based on the embedding position information L and the unique information I acquired from the transmission information V matches the unique information I collected from the input stream U (or the intermediate stream U'). When a match is confirmed, the edit information E' is restored from the edit information E extracted from the intermediate stream U' based on the embedding position information L and the edit information E acquired from the transmission information V, in the same manner as the unique information I'. The program Y then executes the edit processing, indicated by the edit information E', on the input stream U.

The edit information E and the unique information I embedded in the input stream U are divided into multiple packets, which are rearranged at respective embedding positions determined based on the original edit information E and unique information I in the input stream U. When the edit information E and the unique information I are to be extracted without using the embedding position information L or are to be extracted using unauthentic embedding position information L, the packets cannot be appropriately arranged and the restored unique information I' does not match the original unique information I.

On the other hand, when the correct embedding position information L is used to extract the edit information E and the unique information I, the restored unique information I' and the unique information I collected from the input stream U match each other. In this case, since the edit information E' restored also matches the original edit information E, the user can execute desired edit processing, determined using the program X, on the input stream U by executing the edit processing indicated by the edit information E'.

According to the program X, the positions at which the packets of the edit information E and the unique information I in the input stream U are to be embedded are determined based on the original edit information E and the unique information I. The embedding position information L generated is determined as information that is unique to one input stream U (i.e., the unique information I) and one edit operation (i.e., the edit information E).

Thus, even if the program Y is executed with respect to an input stream U and an edit operation that are different from the input stream U and the edit operation used for the embedding position information L generation performed by the program X, the embedding position information L and the actual embedding position differ from each other. Thus, the unique information I' extracted does not match the unique information I. In this case, the program Y terminates the operation in order to prevent fraudulent use, thereby achieving application-software protection.

That is, the unique information I' extracted based on the embedding position information L is information that depends on the embedding position information L, and thus, when the embedding position information L is authentic embedding position information, the unique information I' matches the original unique information I. Similarly, the edit information E' extracted based on the embedding position information L also matches the original edit information E when the embedding position information L is authentic embedding position information. Thus, the program X and the program Y included in the application software determine whether or not the input stream U and the edit operation are authentic by checking the matching between the edit information E, the unique information I, and the embedding position information L that are dependent on each other. Consequently, the application software is protected against fraudulent use.

In addition, the unique information I is unique to data contained in the input stream U, and thus pieces of unique information I in different input streams do not match each other. Thus, determination of the matching of the pieces of unique information I makes it possible to determine whether or not the input stream is an identical one. This arrangement, therefore, protects an application program from being fraudulently used for an unauthentic input stream.

The item number of each null packet in the intermediate stream U' and the item number of the edit information E or the unique information I embedded in the null packet are assigned based on the above-described regulation. Thus, for example, when the edit information E and the unique information I are extracted without using the embedding position information L, appropriate arrangement according to the item numbers cannot be performed, thereby making it difficult to restore the original edit information E and unique information I.

(1-2) Second Operation Example

Figure 6:
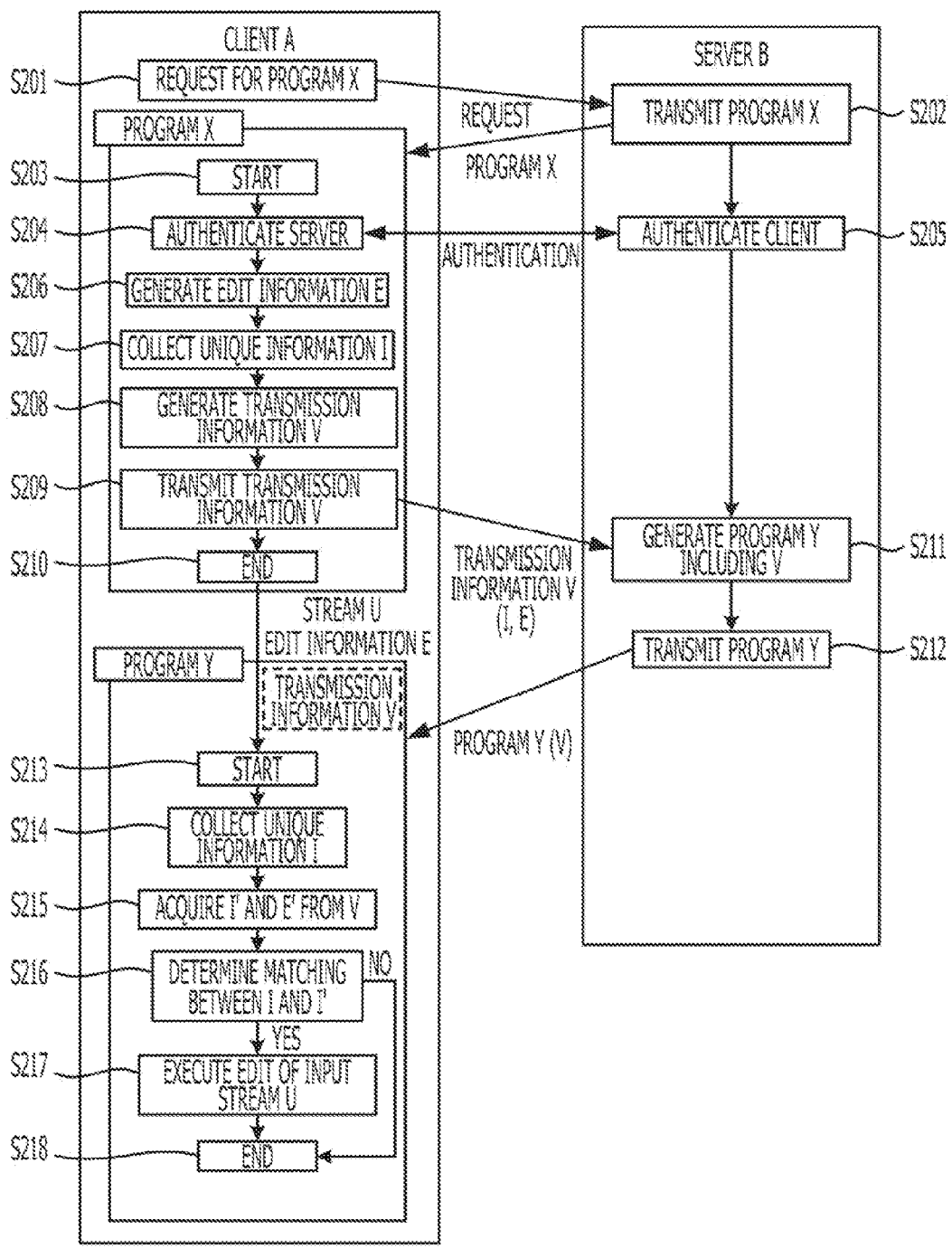
FIG. 6 illustrates a processing flow in a second operation example of the application-software protection.

Next, a second operation example of application-software protection according to the embodiment will be described with reference to FIG. 6. FIG. 6 illustrates a processing flow in the second operation example of the application-software protection.

As illustrated in FIG. 6, the application-software protection is realized in a data (e.g., a stream) edit processing system including a client A and a server B that can transmit/receive data over a network. In this case, a description will be given of an operation example when the client A edits an input stream U.

First, in operation S201, the client A transmits, to the server B, a request for a program X including application software used for edit processing and for determining an edit operation. In operation S202, the server B transmits the requested program X to the client A. In operation S203, the client A launches the transmitted program X to start an operation. Upon launch of the program X, the process proceeds to operations S204 and S205 in which the program X performs authentication processing between the client A and the server B to authenticate whether or not they are an appropriate client and server. That is, the operations S201 to S205 in the second operation example are analogous to the operations S101 to S105 in the first operation example described above.

In operation S206, the program X determines an operation of edit processing for an input stream U. In operation S207, at the same time of, before, or after the generation of the edit information E, the program X collects unique information I, which is information unique to the input stream U. The operations S206 and S207 in the second operation example are analogous to the operations S106 and S107 in the first operation example described above.

In operation S208, the program X generates transmission information V containing all of the generated edit information E and the collected unique information I. The generated transmission information V becomes, for example, sequential data of the edit information E and the unique information I for each frame.

In operation S209, the program X transmits the generated transmission information V to the server B. Thereafter, in operation S210, the program X ends the operation.

Subsequently, in operation S211, the server B generates a program Y in which the received transmission information V is embedded and application software for executing edit processing is included. In operation S212, the server B transmits the generated program Y to the client A. In operation S213, the client A launches the transmitted program Y to start an operation.

After the launch, in operation S214, the program Y collects the unique information I from the input stream U (in other words, the intermediate stream U' that is the same as the input stream U), as in operation S116 in the first operation example described above. In this case, the program Y collects the unique information I from the input stream U, for example, as in the operation performed by the program X in operation S207.

Subsequently, in operation S215, the program Y acquires the edit information E and the unique information I from the transmission information V embedded in the program Y. The edit information E in this case is the edit information generated by the program X in operation S206, contained in the transmission information V, and then transmitted to the server B. The unique information I is the unique information collected by the program X in operation S207, contained in the transmission information V, and then transmitted to the server B. The edit information E and the unique information I acquired from the transmission information V are referred to as edit information E' and unique information I', respectively, for discrimination therebetween.

In operation S216, the program Y determines whether or not the unique information I collected in operation S214 and the unique information I' acquired in operation S215 match. In this operation example, since the transmission information V is generated to include all of the edit information E and the unique information I, the edit information E' and the unique information I' that are the same as the original edit information E and the unique information I, respectively, should be acquired in operation S215.

When it is confirmed that the unique information I and the unique information I' match, the process proceeds to operation S217 in which the program Y executes the edit operation, indicated by the edit information E', on the input stream U and outputs the resulting stream as an edit stream W. Thereafter, in operation S218, the program Y ends the operation. On the other hand, when the unique information I and the unique information I' do not match, the program Y terminates all the processing to end the operation.

In the second operation example of the application-software protection, the edit information E and the unique information I are not embedded in the input stream U (in other words, the intermediate stream U' that is the same as the input stream U), and are embedded in the program Y after all of the edit information E and the unique information I are transmitted to the server B as the transmission information V. Thus, even when a user fraudulently obtains the application software, he or she inputs unauthentic data to each program and is thus unable to fraudulently obtain a processing result.

The program Y in which the transmission information V containing all of the edit information E and the unique information I is embedded is a dedicated program for executing edit processing, based on the edit information E' acquired from the transmission information V, on the input stream U having the unique information I that matches the unique information I' acquired from the transmission information V. That is, the program Y is generated in order to execute a single operation of edit processing on one input stream. Thus, for example, even when a user obtains the application software by fraudulent means, the application software is protected against unauthentic processing (e.g., authentic edit processing on an unauthentic stream, unauthentic edit processing on an authentic stream, and unauthentic edit processing on an unauthentic stream).

(2) Configuration Example of Input Stream Edit Processing System

Figure 7:
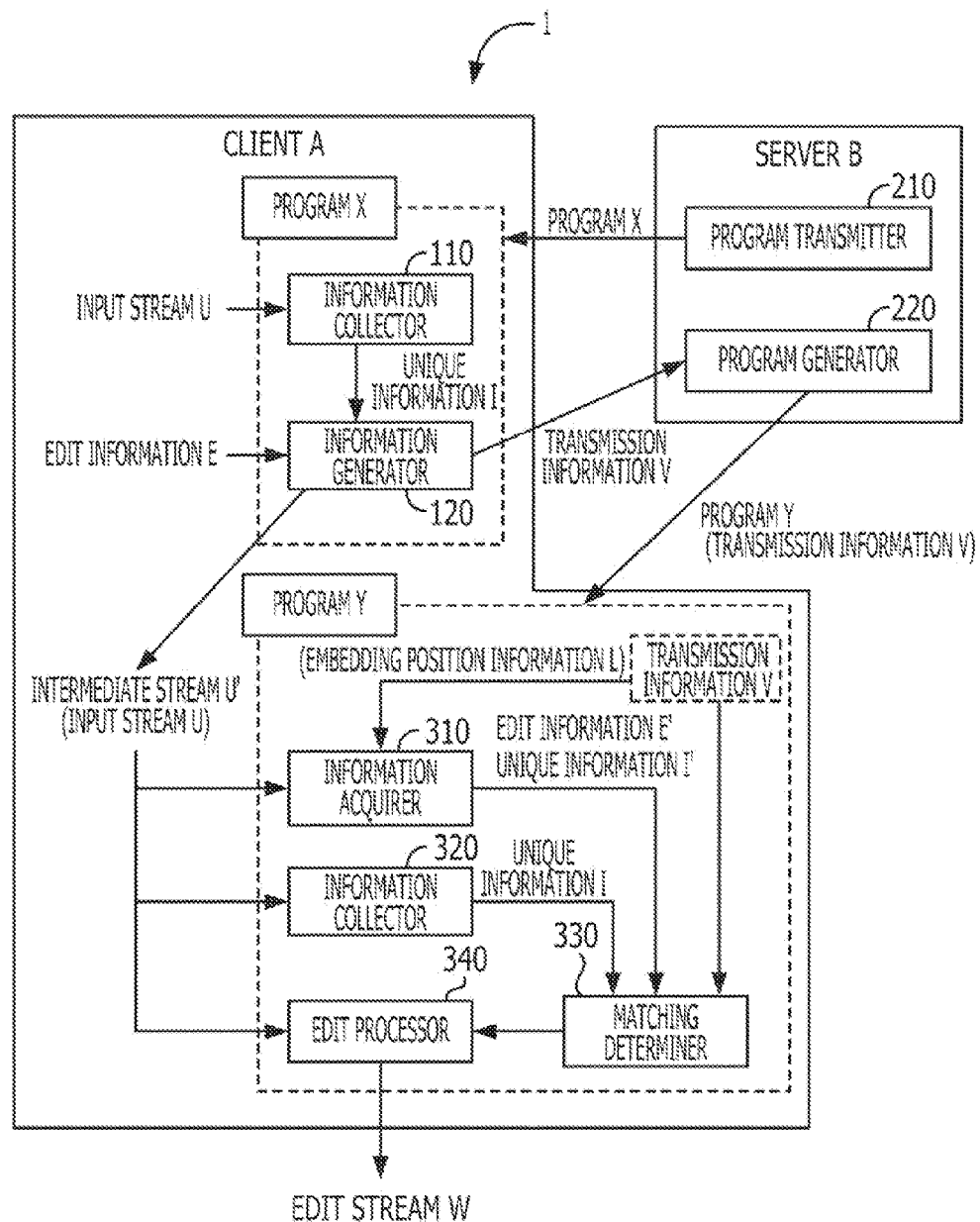
FIG. 7 illustrates the configuration of a stream edit processing system that employs an application-software protection method.

A basic configuration of a stream edit processing system that employs the stream protection method according to the present embodiment will now be described with reference to FIG. 7. FIG. 7 illustrates the configuration of a stream edit processing system 1 that employs the application-software protection method. Although the operations of the blocks in the stream edit processing system 1 are different from each other between the first operation example and the second operation example of the above-described application-software protection, they will be collectively described hereinafter.

A client A serves as an information processing terminal for executing a program X and a program Y that are application software transmitted from a server B over a network. The client A is, for example, a personal computer that executes, for example, an edit task on stream data of a moving image or the like. The program X has an information collector 110 and an information generator 120 as logical processing blocks realized by the program X being executed by a CPU (central processing unit, not illustrated) in the client A. The program Y has an information acquirer 310, an information collector 320, a matching determiner 330, and an edit processor 340 as logical processing blocks realized by the program Y being executed by the CPU (not illustrated) in the client A. Transmission information V is also embedded in the program Y.

The server B has a program transmitter 210 for transmitting the program X and a program generator 220 for generating and transmitting the program Y.

The information collector 110 in the program X is a processing block that constitutes part of information generating means. The information collector 110 receives an input of the input stream U and collects the unique information I from the input stream U.

The information generator 120 is a processing block that constitutes part of first editing means and the information generating means. For example, in response to a user operation, the information generator 120 receives an input of an edit operation for the input stream U and generates edit information E indicating the edit operation.

The information generator 120 further generates transmission information V on the basis of the edit information E and the unique information I. The generation of the transmission information V is performed by a method that is different from the method used in the above-described first and second operation examples of the application-software protection.

The information generator 120 according to the first operation example generates an intermediate stream U' by embedding the edit information E and the unique information I into the input stream U and also generates embedding position information L. In this case, the information generator 120 performs the embedding so that the individually packetized edit information E and unique information I are rearranged at positions determined based on the original edit information E and unique information I in the input stream U. The information generator 120 further generates the transmission information V by arranging the packets of the edit information E and the unique information I that were not embedded in the input stream U. With respect to the packets that were embedded in the input stream U, the embedding position information L indicating the packet embedding positions, instead of the packets, is embedded in the transmission information V.

On the other hand, the information generator 120 according to the second embodiment generates the transmission information V by arranging all of the packets of the packetized edit information E and unique information I.

The information generator 120 also transmits the generated transmission information V to the server B. Preferably, after transmitting the transmission information V, the program X ends the operation.

The program transmitter 210 in the server B receives a program request from the client A and transmits the program X to the client A.

The program generator 220 generates the program Y in which the transmission information V transmitted from the client A is embedded and transmits the program Y to the client A.

The information acquirer 310 in the program Y acquires the edit information E and the unique information I contained in the transmission information V. The edit information E and the unique information I acquired are referred to as edit information E' and unique information I' for discrimination therebetween. In this case, in the above-described first operation example of the application-software protection, the transmission information V contains some of the packets of the edit information E and the unique information I and the embedding position information L indicating the positions at which the other packets are embedded in the intermediate stream U'. Accordingly, with respect to some of the packets of the edit information E and the unique information I which are not contained in the transmission information V, the information acquirer 310 according to the first operation example acquires the edit information E' and the unique information I' by extracting the information from the intermediate stream U' on the basis of the embedding position information L contained in the transmission information V. On the other hand, the information acquirer 310 according to the second operation example generates the edit information E' and the unique information I' by arranging the packets arranged in the transmission information V.

The information collector 320 collects the unique information I from the input stream U or the intermediate stream U', in the same manner as the information collector 110 in the program X.

The matching determiner 330 determines whether or not the unique information I' acquired by the information acquirer 310 and the unique information I collected by the information collector 320 match and notifies the edit processor 340 of a result of the determination. When the unique information I' and the unique information I do not match each other, the program Y preferably terminates the entire processing of the program Y to end the operation.

When the result of the matching determination performed by the matching determiner 330 indicates that the unique information I' and the unique information I match, the edit processor 340 executes edit processing on the input stream U in accordance with the edit information E'. Consequently, an edit stream W subjected to the edit processing is generated.

In the stream edit processing system described above, either of the first and second operation examples of the above-described application-software protection protects the application software against fraudulent use.

Thus, for example, even when a user fraudulently obtains a first program and a second program, he or she cannot execute desired edit processing on a desired stream. Thus, the application-software is protected.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A method for protecting application software transmitted from a server to a client over a network, the method comprising:
   determining an edit operation for an input stream using a first program;
   transmitting transmission information to the server, the transmission information including first characteristic information indicating a characteristic of the input stream and edit information indicating the edit operation;
   receiving a second program for executing the edit operation on the input stream, the second program including the transmission information;
   obtaining second characteristic information from the second program;
   comparing the first characteristic information and the second characteristic information;
   executing, on the input stream, an edit based on the edit information by using the second program, when the first characteristic information and the second characteristic information match; and
   embedding part of the first characteristic information and the edit information at positions included in the input stream;

wherein, in the transmitting the transmission information to the server, the transmission information includes the edit information that is not embedded in the input stream, the first characteristic information that is not embedded in the input stream, and position information indicating the position at which the first characteristic information is embedded and the position at which the edit information is embedded; and in the executing the edit based on the edit information, the embedded first characteristic information and the embedded edit information are acquired based on the position information included in the transmission information, and when the characteristic of the input stream matches a characteristic indicated by the embedded first characteristic information or the second characteristic information included in the transmission information in the second program, the edit based on the edit information is executed on the input stream through use of the second program.

2. The method according to claim 1, further comprising:
generating, at the server, the second program; and
transmitting the second program from the server to the client.

3. The method according to claim 1, wherein the embedded part of the characteristic information and the edit information is determined based on available packets in the input stream and an amount of the characteristic information and the edit information.

4. The method according to claim 3, wherein the available packets are null packets.

5. A method for protecting application software transmitted from a server to a client over a network, the method comprising:
determining an edit operation for an input stream using a first program;
embedding, at positions included in the input stream, characteristic information indicating a characteristic of the input stream and edit information;
transmitting transmission information from the client to the server, the transmission information including position information indicating the position at which the characteristic information is embedded and the position at which the edit information is embedded;
receiving a second program for executing the edit operation on the input stream, the second program including the transmission information; and
acquiring the embedded characteristic information and the embedded edit information on a basis of the position information included in the transmission information; and
executing, on the input stream, an edit based on the edit information by using the second program, when the characteristic of the input stream and a characteristic indicated by the embedded characteristic information match,
wherein in the embedding, part of the characteristic information and the edit information is embedded at the positions included in the input stream;
wherein, in the transmitting the transmission information to the server, the transmission information includes the edit information that is not embedded in the input stream, the characteristic information that is not embedded in the input stream, and the position information; and
in the executing the edit based on the edit information, when the characteristic of the input stream matches a characteristic indicated by the embedded characteristic information embedded in the input stream or included in the transmission information in the second program, the edit based on the edit information is executed on the input stream through use of the second program.

6. The method according to claim 5, further comprising:
generating, at the server, the second program, the second including the embedded characteristic information; and
transmitting the second program from the server to the client.

7. A stream edit processing system comprising:
a client; and
a server operable connected over a network;
wherein the client includes
a first memory; and
a first processor executing instructions stored in the first memory to implement,
an information unit including an input stream, and
a first transmitting unit to transmit transmission information from the client to the server, the transmission information including characteristic information indicating a characteristic of the input stream and edit information indicating an edit operation to be performed on the input stream;
the server includes
a second memory; and
a second processor executing instructions stored in the second memory to implement,
a program generating unit to generate a second program for executing the edit operation on the input stream, the second program including the transmission information, and
a second transmitting unit to transmit the second program to the client; and
the first processor executing further instructions stored in the first memory to implement,
a second editing unit for executing, on the input stream, an edit based on the edit information by using the second program, when the characteristic of the input stream and a characteristic indicated by the characteristic information included in the transmission information in the second program match,
wherein the first processor executes further instructions stored in the first memory to implement an embedding unit to embed part of the first characteristic information and the edit information at positions included in the input stream;
wherein, in transmission information transmitted to the server, the transmission information includes the edit information that is not embedded in the input stream, the first characteristic information that is not embedded in the input stream, and position information indicating the position at which the first characteristic information is embedded and the position at which the edit information is embedded; and
in the executing the edit based on the edit information, implemented by the first processor, the embedded first characteristic information and the embedded edit information are acquired based on the position information included in the transmission information, and when the characteristic of the input stream matches a characteristic indicated by the embedded first characteristic information or the second characteristic information included in the transmission information in the second program, the edit based on the edit information is executed on the input stream through use of the second program.

8. A client of a stream edit processing system including a server and the client, wherein application software including a first program and a second program are transmitted from the server to the client over a network, the client comprising:

a memory; and a processor executing instructions stored in the memory to implement, a first editing unit to determine an edit operation for an input stream by using the first program;

an embedding unit to embed, at positions included in the input stream, characteristic information indicating a characteristic of the input stream and edit information;

a first transmitting unit to transmit transmission information from the client to the server, the transmission information including position information indicating the position at which the characteristic information is embedded and the position at which the edit information is embedded;

a receiving unit to receive a second program for executing the edit operation on the input stream, the second program including the transmission information; and a second editing unit to acquire the embedded characteristic information and the embedded edit information on a basis of the position information included in the transmission information and to execute, on the input stream, an edit based on the edit information by using the second program when the characteristic of the input stream and a characteristic indicated by the embedded characteristic information match, wherein the embedding unit embeds, part of the characteristic information and the edit information at the positions included in the input stream;

wherein the transmission information transmitted by the first transmitting unit includes the edit information that is not embedded in the input stream, the characteristic information that is not embedded in the input stream, and the position information; and the second editing unit executes the edit based on the edit information, when the characteristic of the input stream matches a characteristic indicated by the embedded characteristic information embedded in the input stream or included in the transmission information in the second program, the edit based on the edit information is executed on the input stream through use of the second program.

9. The client of the stream processing system according to claim 8, wherein the server of the stream processing system includes:

a server memory; and a server processor executing instructions stored in the server memory to implement, a program generating unit to generate the second program for executing the edit operation on the input stream, the second program including the transmission information, and a second transmitting unit to transmit the second program to the client.

* * * * *